(12) United States Patent
Fekete

(10) Patent No.: US 10,422,874 B2
(45) Date of Patent: Sep. 24, 2019

(54) METHOD AND SYSTEM FOR SPATIAL MODELING OF AN INTERIOR OF A VEHICLE

(71) Applicant: VOLVO CAR CORPORATION, Gothenburg (SE)

(72) Inventor: Robert Fekete, Lund (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 15/952,855

(22) Filed: Apr. 13, 2018

(65) Prior Publication Data

US 2018/0306917 A1    Oct. 25, 2018

(30) Foreign Application Priority Data

Apr. 20, 2017 (EP) .................... 17167198

(51) Int. Cl.

| | |
|---|---|
| *G01S 15/89* | (2006.01) |
| *G01S 15/52* | (2006.01) |
| *G01S 15/42* | (2006.01) |
| *G01S 15/87* | (2006.01) |
| *G01S 15/00* | (2006.01) |
| *G01S 7/54* | (2006.01) |
| *G01S 7/539* | (2006.01) |
| *B60N 2/00* | (2006.01) |

(Continued)

(52) U.S. Cl.
CPC .............. *G01S 15/89* (2013.01); *B60N 2/002* (2013.01); *G01S 7/539* (2013.01); *G01S 7/54* (2013.01); *G01S 13/56* (2013.01); *G01S 13/87* (2013.01); *G01S 15/003* (2013.01); *G01S 15/42* (2013.01); *G01S 15/523* (2013.01); *G01S 15/87* (2013.01)

(58) Field of Classification Search
CPC ........ G01S 15/89; G01S 15/003; G01S 15/42; G01S 15/523; G01S 7/54; G01S 7/539
USPC .......................................................... 367/904
See application file for complete search history.

(56) References Cited

U.S. PATENT DOCUMENTS

| | | | |
|---|---|---|---|
| 6,029,105 A | 2/2000 | Schweizer | |
| 2007/0135982 A1* | 6/2007 | Breed ................. | B60J 10/00 701/36 |
| 2012/0303182 A1* | 11/2012 | Choi ................... | G08C 17/02 701/2 |

OTHER PUBLICATIONS

NPL for 15952855___by Zhayida et al___An Automatic System for Acoustic Microphone Geometry Calibration based on Minimal Solvers___Oct. 10, 2016 (Year: 2016).*

(Continued)

*Primary Examiner* — Steven Lim
*Assistant Examiner* — Mancil Littlejohn, Jr.
(74) *Attorney, Agent, or Firm* — Brooks Kushman P.C.

(57) ABSTRACT

A method is described for spatial modelling of an interior of a vehicle. The method includes transmitting a wireless signal, from each of multiple transmitters, each transmitter having a known location in the vehicle, receiving, by multiple receivers, multiple reflection signals having been reflected in the interior of the vehicle, each receiver having a known location in the vehicle. The method also includes, for the received reflection signals, determining a source data set by determining multipath propagation components, Doppler shifts, phase shifts and time differences of the received reflection signals, and determining a spatial model of at least a portion of the vehicle interior by applying a computer vision algorithm on the source data set. A system is also described for performing the method.

15 Claims, 2 Drawing Sheets

(51) Int. Cl.
    *G01S 13/56*     (2006.01)
    *G01S 13/87*     (2006.01)

(56)            References Cited

OTHER PUBLICATIONS

European Patent Office, Extended European Search Report for corresponding Application No. EP17167198.5, dated Nov. 7, 2017.
Zhayida et al., An Automatic System for Acoustic Mcrophone Geometry Calibration based on Minimal Solvers, Oct. 7, 2016, XP055420013, retrieved from the Internet <<https://arxiv.org/pdf/1610.02392.pdf<<, 30 pages.

* cited by examiner

METHOD AND SYSTEM FOR SPATIAL MODELING OF AN INTERIOR OF A VEHICLE

CROSS-REFERENCE TO RELATED APPLICATIONS

This application claims foreign priority benefits under 35 U.S.C. § 119(a)-(d) to European patent application number EP 17167198.5, filed Apr. 20, 2017, which is incorporated by reference in its entirety.

TECHNICAL FIELD

The present disclosure relates to a method and a system for determining a spatial model of an interior of a vehicle, and in particular for determining the location of objects in the vehicle.

BACKGROUND

Several systems are known for detecting the presence of a driver and passengers in a vehicle. Such a system may for example detect if a specific seat is occupied, and provide a seat belt warning if no seat belt is used in the occupied seat. There are also may different types of driver monitoring systems, for example for detecting driver drowsiness, if the driver is incapacitated or ill, and also to for aiding the driver by directing the attention of the driver to relevant events. However, with the increasing number of safety functions in a vehicle, it is desirable to be able to determine both the presence and the location of many types of objects in a vehicle, other than just the driver and passengers.

It is furthermore desirable to not only detect but to possibly also identify objects in the car that is not part of the car interior as such. For example, persons, animals, or bags and other identifiable objects that may be of interest from a security point of view. The detection of objects can be used to determine whether to deploy airbags or not, which airbags or other safety features to deploy in case of an accident, or to warn if objects are a potential hazard in case of a collision, such as bags and other objects which are placed incorrectly. The object detection system can also be used for detecting persons thereby being part of a driver monitoring system, and also helping to identify not only the driver but also all passengers and their absolute position in the car. Finally, an object detection system may advantageously be used to warn an operator of the vehicle in case the doors are locked and the car is to be abandoned, while a person or animal which may have been forgotten are still in the car, which may be dangerous on hot, sunny days.

Accordingly, it is desirable to provide an improved system for object detection and identification in the interior of a vehicle.

SUMMARY

In view of above-mentioned and other drawbacks of the prior art, it is an object of the present disclosure to provide an improved method and system for object detection and identification in a vehicle. In particular, an object of the present disclosure is to provide a method and system for spatial modelling of the interior of the vehicle.

According to a first embodiment of the disclosure, there is provided a method for spatial modelling of an interior of a vehicle, the method comprising: transmitting a wireless signal, from each of a plurality of transmitters, each transmitter having a known location in the vehicle; receiving, by a plurality of receivers, a plurality of reflection signals having been reflected in the interior of the vehicle, each receiver having a known location in the vehicle; for the received reflection signals, determining a source data set by determining multipath propagation components, Doppler shifts, phase shifts and time differences of the received reflection signals; and determining a spatial model of at least a portion of the vehicle interior by applying a computer vision algorithm on the source data set.

The transmitter is configured to transmit one or more wireless signals into the interior of the vehicle, where the wireless signals may be radio signals or acoustic signals. It should be understood that a plurality of transmitters may be arranged to transmit signals in various directions, and that the specific configuration and placement of transmitters and receivers may be determined for each specific vehicle interior, depending on the design of the interior.

Next, the signals are reflected in various surfaces and objects in the interiors before reaching the receivers. The transmitted signals may have been reflected one or more times in objects in the vehicle. The received reflected signals can be distinguished from any transmitted signals directly reaching a receiver without reflection based on e.g. the signal amplitude and phase. It is also assumed that the empty interior of the vehicle is known such that the algorithm can determine deviations from the empty interior.

In the present context, determining the source data set should be interpreted to include all the information gathering and signal processing required as input to the computer vision algorithm. The source data set is determined based in the received reflected signals and with knowledge of the properties of the transmitted signals.

The spatial model is a three-dimensional model of the vehicle interior. It is also possible to determine the model for only part of the interior. The transmitter and receiver arrangement may for example be adapted for only determining a model of comprising the front seats of the vehicle, or the algorithm may be configured to select to only model a particular volume of interest.

The present disclosure is based on the realization that algorithms previously used for computer vision may be applied also for wireless signals in order to form a three-dimensional model based on reflected signals. In particular, the described method provides a detailed description of the vehicle interior, without the need for cameras and related image analysis circuitry, which can simplify and thereby increase the availability of spatial modelling such systems in vehicles. However, it should be noted that graphics processing units and the like may be used also for spatial modelling. Moreover, the spatial model may be used to increase the efficiency of various safety features and also to warn for potentially dangerous situations arising from the presence of objects in the interior of the vehicle.

According to one embodiment of the disclosure, applying the computer vision algorithm comprises performing generalized cross correlation with phase transform, GCC-PHAT, which is a method for computing time delays between signals and reference signals where the signals may have multiple channels.

According to one embodiment of the disclosure, the method may further comprise explicitly tracking the multipath components. The multi path components are then used in the spatial modelling.

According to one embodiment of the disclosure, the method may further comprise identifying and categorizing objects in the vehicle. The method may for example comprise identifying specific objects, such as persons in the vehicle. The identified objects may also be defined in terms of different categories such as animate and inanimate objects. Moreover, the objects may be defined and categorized based on shape, size, location etc.

According to one embodiment of the disclosure, applying one or more computer vision algorithms may advantageously comprise employing a neural network for analyzing the source data set. A neural network can be used for classification and also for forming the spatial model. The computer vision algorithm may consist of a signal processing part and a geometry estimation part where the resulting spatial model is formed. When signal processing is done, a neural network may be trained, in a similar manner as for images when training a neural network for image recognition. The advantages with a neural network are thus the same as for image recognition. Either a neural network is trained on the signal processed data or specific algorithms can be used, advantageously both algorithms and a neural network is used in combination.

According to one embodiment of the disclosure, the method may advantageously comprise identifying locations of vehicle occupants. Thereby, safety features and other functions in the vehicle can be adapted based on if a seat is occupied or not. It is also possible to detect and warn if a vehicle occupant is in an unsafe location in the vehicle.

According to one embodiment of the disclosure, the transmitted signals may be audio signals having a frequency in the range of 20-30 kHz or in the range of 40-50 kHz. Audio signals having a frequency in the range of 20-30 kHz may advantageously be used since they can be emitted by speakers in an existing entertainment system of the vehicle, thereby not requiring additional dedicated transmitters for transmitting the signals. However, audio signals in the low ultrasound range, i.e. around 20 Hz may be detected by some animals and may not be desirable for that reason. Thereby, audio signals having a frequency above 40 kHz may be advantageously used. It should however be understood that signals of other frequencies also may be used.

According to one embodiment of the disclosure, the transmitted signals may be radio signals having a frequency of 2.5 GHz or 5 GHz. Thereby, an existing WiFi transmitter of the vehicle typically operating at one of the aforementioned frequencies may be used. It may also be advantageous to employ a combination of audio and radio signals to derive additional information for use by the computer vision algorithm.

According to one embodiment of the disclosure, transmitting a wireless signal may comprise transmitting a plurality of separate signals having different properties. Accordingly, both audio and radio signals may be used, and the transmitted signals may have different amplitude or modulation in order to acquire more detailed source data for use by the computer vision algorithm. For example, the transmitted signals may have overlapping or non-overlapping bandwidths, and the signals may be sent sequentially or in parallel. It is also possible that one transmitter sends different signals sequentially, or that specific transmitters are adapted to only transmit a particular signal.

According to one embodiment of the disclosure, method may further comprise determining a temperature and airflow properties in the vehicle, and wherein the spatial model is determined based on the determined temperature and airflow properties. The propagation properties of wireless signals, and of audio signals in particular, depend on the properties of the medium in which they propagate. Thereby, by taking the temperature and airflow of the vehicle interior into account when forming the spatial model an increased accuracy can be achieved. It is also possible to measure and include additional environmental parameters such as humidity. Moreover, the described environmental parameters may be measured at several different locations in the vehicle such that the propagation properties in the vehicle can be determined with an even higher accuracy in case there are noticeable variations throughout the vehicle interior. The environmental parameters are mainly important for lower frequencies in the range of audio or ultrasound frequencies.

According to one embodiment of the disclosure the method may comprise identifying an object by comparing the determined spatial model with a predetermined spatial model of an empty vehicle.

According to a second embodiment of the disclosure, there is provided a system for spatial modelling of an interior of a vehicle, the system comprising: a plurality of transmitters at known locations within the vehicle, each transmitter being configured to transmit a wireless signal; a plurality of receivers at known locations within the vehicle, each receiver being arranged and configured to receive a plurality of reflection signals having been reflected in the interior of the vehicle; a spatial modelling control unit connected to the transmitters and receivers and configured to, for the received reflection signals, determining a source data set by determining multipath propagation components, Doppler shifts, phase shifts and time differences of the received reflection signals, and to determine a spatial model of at least a portion of the vehicle interior by applying a computer vision algorithm on the source data set.

According to one embodiment of the disclosure, the transmitters may comprise speakers of an entertainment system of the vehicle or ultrasonic transmitters. The transmitters may also be transceivers capable of both transmitting and receiving signals, or the receivers can be arranged separately from the transmitters. Moreover, the transmitters may comprise a WiFi transmitter and receiver of the vehicle.

Additional effects and features of the second embodiment of the disclosure are largely analogous to those described above in connection with the first embodiment of the disclosure.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

The present disclosure will now be described in more detail, with reference to the appended drawings showing example embodiments, wherein.

DETAILED DESCRIPTION

As required, detailed embodiments are disclosed herein. However, it is to be understood that the disclosed embodiments are merely exemplary and that various alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In the present detailed description, various embodiments of the system and method according to the present disclosure are mainly described with reference to a vehicle comprising ultrasonic transmitters and receivers arranged and configured for spatial modelling of the vehicle interior.

Figure 1:
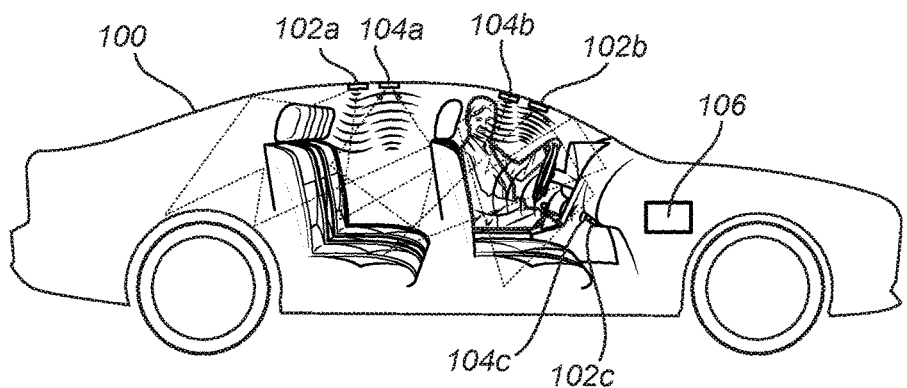
FIG. 1 schematically illustrates a vehicle comprising a system according to an embodiment of the disclosure.
Figure 2:
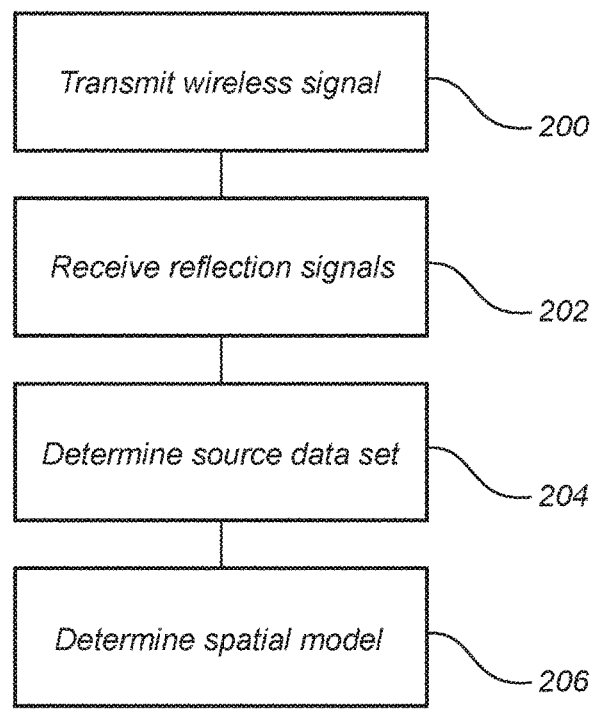
FIG. 2 is a flow chart outlining the general steps of a method according to an embodiment of the disclosure.

FIG. 1 schematically illustrates a vehicle comprising a system for spatial modelling of an interior of a vehicle according to an embodiment of the disclosure. The system of FIG. 1 will be described with further reference to the flow chart of FIG. 2 outlining the general steps of a method for spatial modelling of an interior of a vehicle according to an embodiment of the disclosure.

The system of FIG. 1 comprises a plurality of transmitters, 102a-c at known locations within the vehicle 100. Each of the transmitters configured to transmit 200 a wireless signal into the vehicle interior. The system further comprises a plurality of receivers 104a-c at known locations within the vehicle 100, where each receiver is arranged at a suitable location arranged and configured to receive 202 a plurality of reflection signals having been reflected in the interior of the vehicle. Even though the transmitters 102a-c and receivers 104a-c are illustrated as separate units, the transmitters 102a-c and receivers 104a-c may equally well be embodied by transceivers having the capability to both transmit and receive signals. The transmitters 102a-c and receivers 104a-c may also be located at a distance from each other, and the number of transmitters may be different from the number of receivers. Accordingly, the specific placement of transmitters and receivers within the vehicle can be assumed to be different for different vehicles and for different applications.

The system further comprises a spatial modelling control unit 106 connected to the transmitters and receivers. The control unit 106 can be considered to control both the transmission of signals as well as the following processing of the received reflected signals. The control unit 106 may include a microprocessor, microcontroller, programmable digital signal processor or another programmable device. The control unit 106 may also, or instead, include an application specific integrated circuit, a programmable gate array or programmable array logic, a programmable logic device, a digital signal processor or equivalent hardware. Where the control unit 106 includes a programmable device such as the microprocessor, microcontroller or programmable digital signal processor mentioned above, the processor may further include memory and computer executable code that controls operation of the programmable device.

Accordingly, the control unit 106 may be a specific spatial modelling control unit or it may be a general purpose control unit being part of the vehicle infrastructure.

It is also noted that the spatial modelling control unit 106 and any other unit, control unit, controller, model, algorithm, filter, device, unit, feature, system, functionality, module, arrangement, or the like described herein may comprise and/or be implemented in or by one or more appropriately programmed processors (e.g., one or more microprocessors including central processing units (CPU)) and associated memory and/or storage, which may include data, firmware, operating system software, application software and/or any other suitable program, code or instructions executable by the processor(s) for controlling operation thereof, for providing and/or controlling interaction and/or cooperation between the various features and/or components described herein, and/or for performing the particular algorithms represented by the various functions and/or operations described herein.

The control unit 106 is further configured to, for the received reflection signals, determining a source data set 204 by determining multipath propagation components, Doppler shifts, phase shifts and time differences of the received reflection signals.

The multipath propagation components describe received reflection signals with respect to multiple reflections, thereby providing additional information for forming the spatial model.

Based on observed Doppler shifts of the received reflected signals it can for example be determined if the signals have been reflected by moving objects. Furthermore, phase shifts and time differences, i.e. differences in a determined time-of-flight, of different reflected signals provide information of the structure and objects of the vehicle interior. Moreover, separating reflected signals from direct signals is performed as part of the analysis of the multipath propagation components, Doppler effects and phase shifts.

Finally, a spatial model of at least a portion of the vehicle interior is determined 206 by applying a computer vision algorithm on the source data set. A set of signals used for determining a spatial model may for example comprise short bursts of well-defined frequencies in a sequence of separate signals. The preferred signal properties also depend on the sensitivity of receivers, such as how well the receiver can distinguish each frequency and also how well a signal generator may generate and a transmitter can transmit a specific frequency.

An example of a computer vision algorithm which may be used for determining a spatial model of the interior of the vehicle based on the above described source data set is described in "An Automatic System for Acoustic Microphone Geometry Calibration based on Minimal Solvers", Zhayida et al., arXiv:1610.02392v1, 7 Oct. 2016, (https://arxiv.org./pdf/1610.02392.pdf), which is incorporated herein by reference in its entirety.

The described method can be seen as consisting of two parts, a signal processing part where the signal characteristics are measured, and a geometry/spatial modeling part where the spatial model is built using Vision Algorithms mentioned in the aforementioned reference. By gathering all information of the signal characteristics such as time of arrival (TOA) and time difference of arrival (TDOA), it is also possible to attempt to perform beamforming in order to measure differences in angles from each measured plane and thus applying structure from motion on the problem.

Computer vision algorithms and related algorithms suitable for spatial modelling are sometimes referred to as "structure from motion" algorithms.

Figure 3:
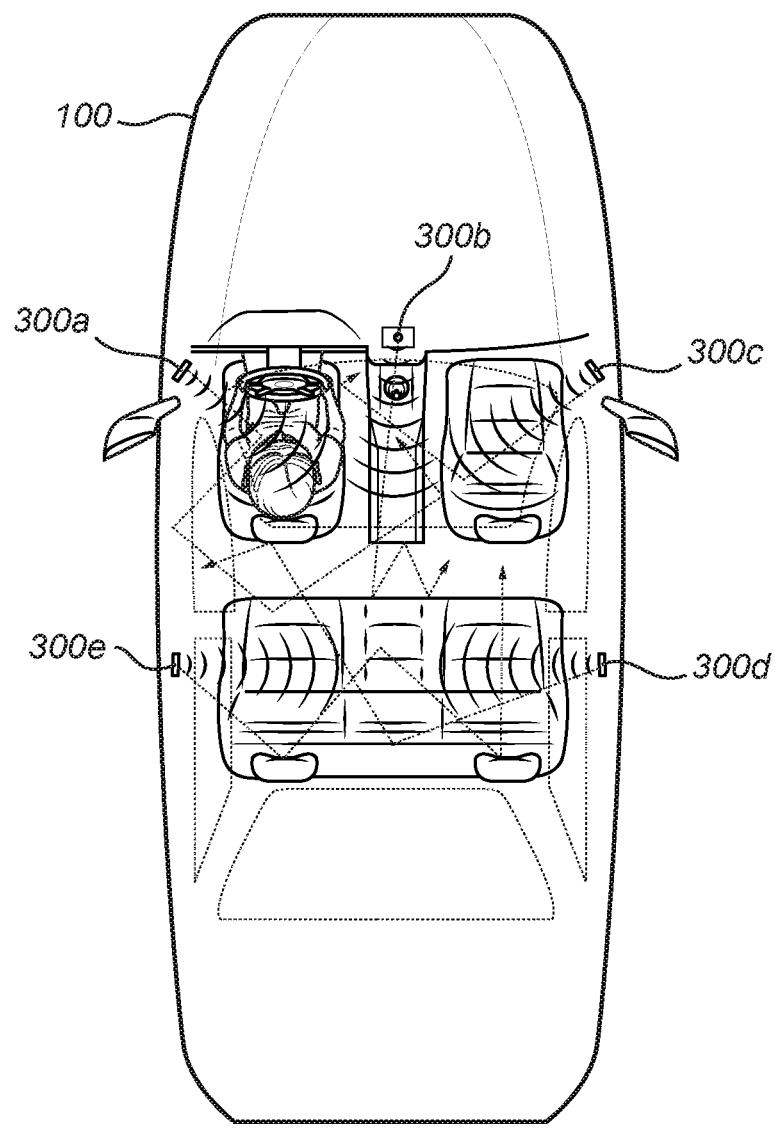
FIG. 3 schematically illustrates a vehicle comprising a system according to an embodiment of the disclosure.

FIG. 3 schematically illustrates a system according to an embodiment of the disclosure where speakers 300a-e of an entertainment system are used as transmitters to transmit an audio signal. The speakers may be configured to transmit signals also in the ultrasound frequency range. For audio signals, the accuracy of the spatial model is in the range of a few millimeters and for radio signals the accuracy can be even higher.

Since propagation of audio signals is sensitive to heat and airflows, this can be taken into account by using HVAC (heating, ventilation and air conditioning) operation data such as temperature, airflow velocity and airflow direction to further improve the signal quality. Moreover, the acoustic signals may advantageously be combined with radio signals such as WiFi or Bluetooth signals provided by radio transmitters of the vehicle.

Even though the disclosure has been described with reference to specific exemplifying embodiments thereof, many different alterations, modifications and the like will become apparent for those skilled in the art. Also, it should be noted that parts of the method and system may be omitted, interchanged or arranged in various ways, the method and system yet being able to perform the functionality of the present disclosure.

Additionally, variations to the disclosed embodiments can be understood and effected from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for spatial modelling of an interior of a vehicle, the method comprising:
   transmitting a wireless signal from each of a plurality of transmitters, each transmitter having a known location in the vehicle;
   receiving, by a plurality of receivers, a plurality of reflection signals having been reflected in the interior of the vehicle, each receiver having a known location in the vehicle;
   for the received reflection signals, determining a source data set by determining multipath propagation components, Doppler shifts, phase shifts and time differences of the received reflection signals, wherein the source data set comprises the determined multipath propagation components, Doppler shifts, phase shifts, and time differences of the received reflection signals; and
   determining a spatial model of at least a portion of the vehicle interior by applying a computer vision algorithm on the source data set.

2. The method according to claim 1 wherein applying the computer vision algorithm comprises performing generalized cross correlation with phase transform, GCC-PHAT.

3. The method according to claim 1 further comprising explicitly tracking the multi-path components.

4. The method according to claim 1 further comprising identifying and categorizing objects in the vehicle.

5. The method according to claim 1 wherein applying a computer vision algorithm comprises employing a neural network for analyzing the source data set.

6. The method according to claim 5 further comprising identifying locations of vehicle occupants.

7. The method according to claim 1 wherein the transmitted signals are audio signals having a frequency in the range of 20-30 kHz or in the range of 40-50 kHz.

8. The method according to claim 1 wherein the transmitted signals are radio signals having a frequency of 2.5 GHz or 5 GHz.

9. The method according to claim 1 wherein transmitting a wireless signal comprises transmitting a plurality of separate signals having different properties.

10. The method according to claim 1 wherein the transmitters comprise speakers of a vehicle entertainment system.

11. The method according to claim 1 further comprising determining a temperature and airflow properties in the vehicle, and wherein the spatial model is determined based on the determined temperature and airflow properties.

12. The method according to claim 1 further comprising identifying an object by comparing the determined spatial model with a predetermined spatial model of an empty vehicle.

13. A system for spatial modelling of an interior of a vehicle, the system comprising:
   a plurality of transmitters for arrangement at known locations within the vehicle, each transmitter configured to transmit a wireless signal;
   a plurality of receivers for arrangement at known locations within the vehicle, each receiver configured to receive a plurality of reflection signals reflected in the interior of the vehicle;
   a spatial modelling control unit connectable to the transmitters and the receivers and configured to (i) for the received reflection signals, determine a source data set by determining multipath propagation components, Doppler shifts, phase shifts and time differences of the received reflection signals, wherein the source data set comprises the determined multipath propagation components, Doppler shifts, phase shifts, and time differences of the received reflection signals, and (ii) determine a spatial model of at least a portion of the vehicle interior by applying a computer vision algorithm on the source data set.

14. The system according to claim 13 wherein the transmitters comprise speakers of an entertainment system of the vehicle or ultrasonic transmitters.

15. The system according to claim 13 wherein the transmitters comprise a WiFi transmitter and receiver of the vehicle.

\* \* \* \* \*